US006973550B2

(12) United States Patent
Rosenbluth et al.

(10) Patent No.: US 6,973,550 B2
(45) Date of Patent: Dec. 6, 2005

(54) MEMORY ACCESS CONTROL

(75) Inventors: Mark B. Rosenbluth, Uxbridge, MA (US); Gilbert M. Wolrich, Framingham, MA (US); Debra Bernstein, Sudbury, MA (US); Richard Guerin, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 10/264,092

(22) Filed: Oct. 2, 2002

(65) Prior Publication Data

US 2004/0068614 A1   Apr. 8, 2004

(51) Int. Cl.[7] .......................... G06F 12/06; G06F 13/16
(52) U.S. Cl. ..................... 711/150; 711/168; 711/153; 711/156
(58) Field of Search ..................... 711/150, 151, 152, 711/153, 156, 167, 168, 169; 710/54, 55

(56) References Cited

U.S. PATENT DOCUMENTS

| 5,379,379 | A | * | 1/1995 | Becker et al. ................. 711/3 |
| 5,564,034 | A | * | 10/1996 | Miyake ....................... 711/128 |
| 5,907,860 | A | * | 5/1999 | Garibay et al. .............. 711/117 |
| 6,324,624 | B1 | | 11/2001 | Wolrich et al. .............. 711/152 |
| 6,532,509 | B1 | | 3/2003 | Wolrich et al. .............. 710/240 |
| 6,560,667 | B1 | | 5/2003 | Wolrich et al. .............. 710/310 |
| 6,578,126 | B1 | * | 6/2003 | MacLellan et al. .......... 711/167 |
| 6,600,693 | B2 | * | 7/2003 | Kim ............................ 365/233 |
| 6,667,920 | B2 | | 12/2003 | Wolrich et al. .............. 365/201 |
| 6,789,143 | B2 | * | 9/2004 | Craddock et al. .............. 710/54 |

OTHER PUBLICATIONS

QDR, Next-Genration Network SRAM, May 14, 2001, pp. 1-20.
INTEL, Intel IXP 1200 Network Processor Family, Hareware Reference Manual, Aug. 2001, pp. 1-272.

* cited by examiner

Primary Examiner—Gary Portka
(74) Attorney, Agent, or Firm—Robert A. Greenberg (57) ABSTRACT

In general, in one aspect, the disclosure describes storing identification of one or more memory buckets associated with different, respective, queued write commands, and, based on the stored identification, determining whether at least one bucket associated with a read command is included in one or more buckets associated with at least one queued write command.

40 Claims, 12 Drawing Sheets

| Start Bucket # | Overflow | Even Tag | Odd Tag | |
|---|---|---|---|---|
| EVEN | NO | bucket# | X | — 180a |
| EVEN | YES | bucket# | bucket#+1 | — 180b |
| ODD | NO | X | bucket# | — 180c |
| ODD | YES | bucket#+1 | bucket# | — 180d |

X – may be set to bucket #

MEMORY ACCESS CONTROL

BACKGROUND

Many computer memory devices operate much like a collection of post office boxes. Based on a letter's address, a postal worker can store a piece of mail in a post office box. A recipient can later check the box to retrieve stored mail. Likewise, to store data in computer memory, an instruction can specify an address and data to store at the address. For example, a write command may identify data to store at memory address "0000". By later accessing address "0000", a read command can retrieve the stored data An extremely diverse set of memory device technologies have been developed. These technologies include RAM (Random Access Memory) devices such as SRAM (Static Random Access Memory), DRAM (Dynamic Random Access Memory), and SDRAM (Synchronous Dynamic Random Access Memory), among others.

Different computer memory devices, even those using similar underlying memory technology, may offer different configurations and capabilities. For example, memory devices can vary in the number of ports they offer for receiving memory access instructions (e.g., read or write instructions). For example, dual-port devices can simultaneously process two different memory access instructions.

Memory devices can also vary in their speed. For example, "single data rate" devices can perform memory operations after each complete "cycle" of a clock signal. In technical terms, a clock signal is usually characterized by upward and downward edges of a square-tooth electric signal. By analogy, it may help to think of the upward edge as a "tick" of an ordinary clock and the downward edge as the "tock". Thus, a single data rate memory clocked by the completion of a cycle may only perform an operation after each "tick". By contrast, a "double data rate" memory operates on half-cycles. That is, such devices can perform memory operations after either the "tick" or the "tock". This can permit a double data rate memory to operate much faster than a single rate memory.

Recently, memory devices featuring both dual-ports and double data rate have become available. Such devices are generally referred to as quad data rate (QDR) memory.

DETAILED DESCRIPTION

Figure 1:
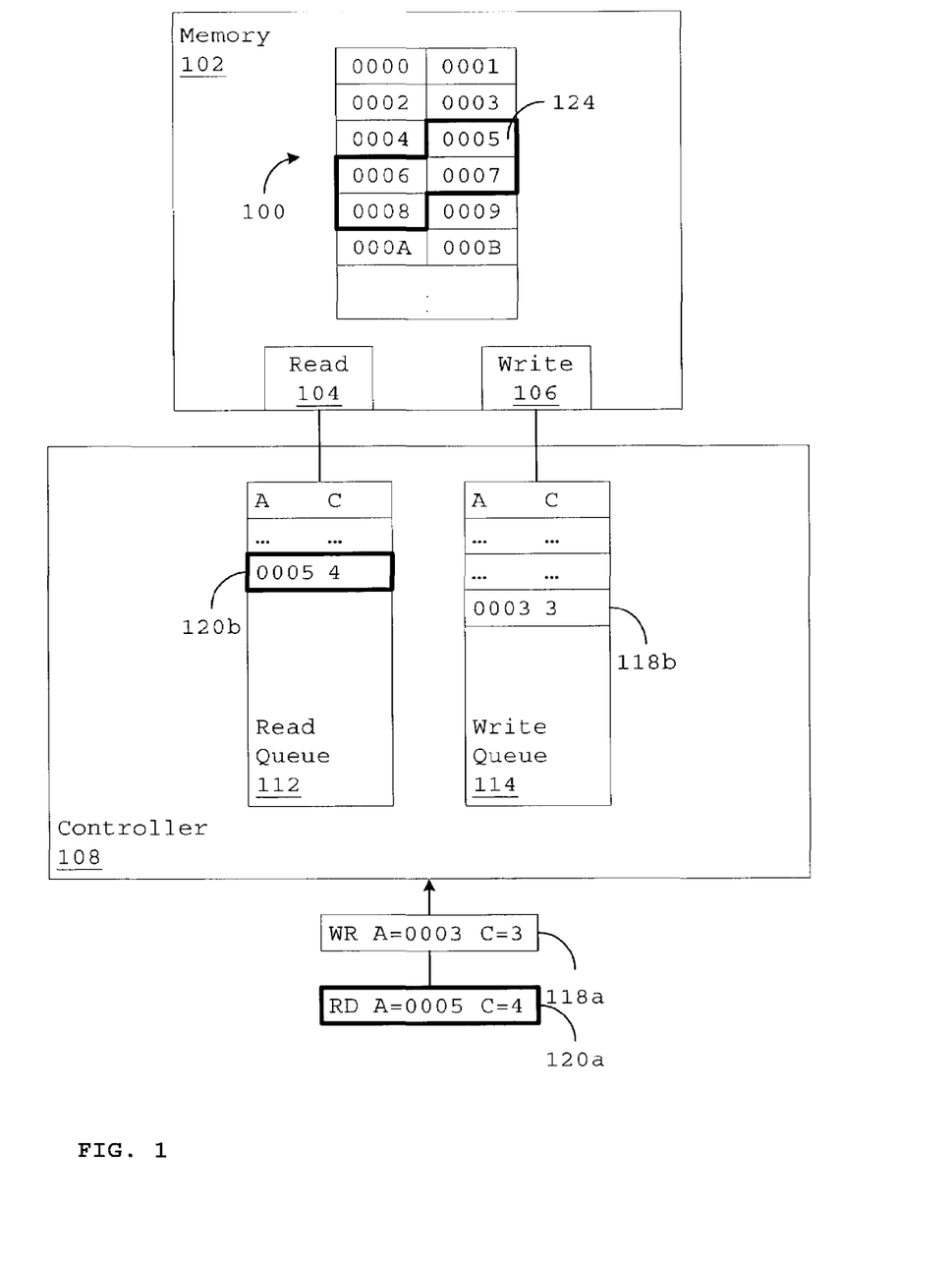
FIGS. 1–3 are diagrams illustrating memory access control.

FIG. 1 depicts a memory device 102 that can store data at different memory addresses 100 (labeled "0000" to "000B"). The dual-port device 102 shown includes a read port 104 and a write port 106 for receiving read and write instructions from a memory controller 108. The controller 108, in turn, receives read and write commands 118a, 120a from other components (not shown in FIG. 1). Generally, memory 102 often runs at slower speeds than other electronic components and may not be able to keep up with a stream of memory access commands. Thus, the controller 108 can queue received memory access commands 118a, 120a. By accessing the queued commands, the controller 108 can issue a memory access instruction to the memory 102 when the memory 102 is ready for a new instruction.

To take advantage of the different ports 104, 106 provided by the memory 102, the controller 108 can sort read and write commands 118a, 120a into different read 112 and write 114 queues. Generally, the read 112 and write 114 queues may operate independently of one another.

Depending on the mix of read and write commands received, the different queues 112, 114 may differ in the number of commands they store at a given instant. As a result, if, for example, a read queue 112 had very few queued read commands while a write queue 114 stored a lengthy backlog of write commands, a newly received read command 120a may advance to the head of its queue 112 before a write command 118a advances to the head of its queue 114 even though the write command 118a may have arrived well before the read command 120a. In many cases (e.g., when the read and write commands are not directed to the same memory address(es)), the order of command processing may be of little or no importance. However, a system may rely on guarantees regarding consistency between reads and writes. For example, a system may rely on a guarantee that a read command issued after a write command should reflect the data stored by the write command. To provide such a guarantee, the controller 108 can implement logic that identifies when a read command requests memory addresses to be accessed for a queued 114 write command.

To illustrate, FIG. 1 shows the controller 108 receiving a write command 118a (abbreviated "WR") followed by a read command 120a (abbreviated "RD"). As shown, the controller 108 queues both commands 118a, 120a in the appropriate read 112 and write 114 queues. In this example, the commands 118a, 120a specify a starting address ("A") and a count ("C") of memory 102 addresses to be accessed for the command. For example, the write command 118a specifies a starting address of "0003" and a count of "3". Thus, the write command 118a will access three memory addresses: "0003", "0004" and "0005" (shown as shaded memory 102 addresses). Similarly, the read command 120a will access four memory addresses starting at address "0005" (shown as outlined memory 102 addresses). The commands 118a, 120a may include other information (e.g., a write command may include or refer to the data being written). Additionally, other command syntaxes may be used to identify the memory addresses to be accessed for a command (e.g., a command may specify a start and end address). Further, as shown, a command need not align the start address relative to the count.

In the example shown, the write command 118a and read command 120a both request access to memory 102 location "0005" 124. Thus, if the controller 108 issues a memory access instruction for the read command 120b to the memory 102 before issuing an instruction for the write command 118b, the data returned by the memory 102 for the read command 120b may not reflect the data written by the earlier received write command 118b.

To prevent the scenario described above from occurring, a controller 108 can store a list (not shown) of memory addresses to be accessed by write commands in the write queue 114. In such a scheme, when the controller 108 receives a read command, the controller 108 could lookup the addresses to be accessed for the read command within the list of memory addresses to be accessed for queued write commands. If the controller 108 identified a pair of read and write commands accessing the same address(es), the controller 108 can create a "link" between the read command 120a and a queued 114 write command 118a (e.g., by storing data associating the read 120a with the write 118a). The controller 108 could "hold" the read command from the memory 102 until an instruction for the linked write command was issued to the memory 102. This can provide consistency between read and write commands. The approach, however, could use a large amount of storage to hold the list of addresses. Additionally, for a read command accessing n-addresses, the technique could require up to n searches of the list. For example, for read command 120a, a search for memory addresses "0005", "0006", "0007", "0008" may be performed.

Figure 2:
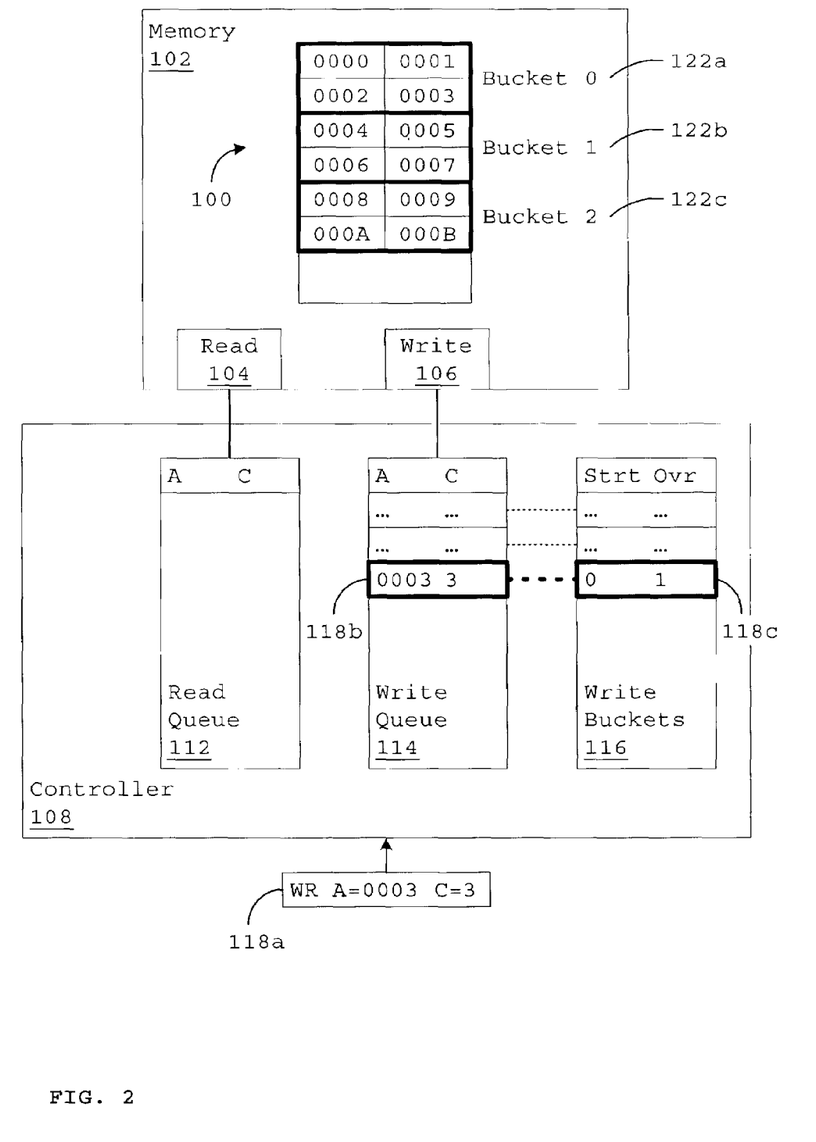

Another approach aggregates different memory addresses into a collection of buckets. For example, FIG. 2 illustrates a collection of buckets 122 that map to different sets of memory addresses 100. For example, bucket "0" 122a includes memory addresses "0000" to "0003" while bucket "1" 122b includes memory addresses "0004" to "0007". For ease of illustration, FIG. 2 depicts the bucket organization as a feature provide by memory 102, however, a memory device 102 need not be aware of the bucket scheme. Instead, the controller 108 may "superimpose" the bucket scheme as its view of the memory's organization.

Figure 3:
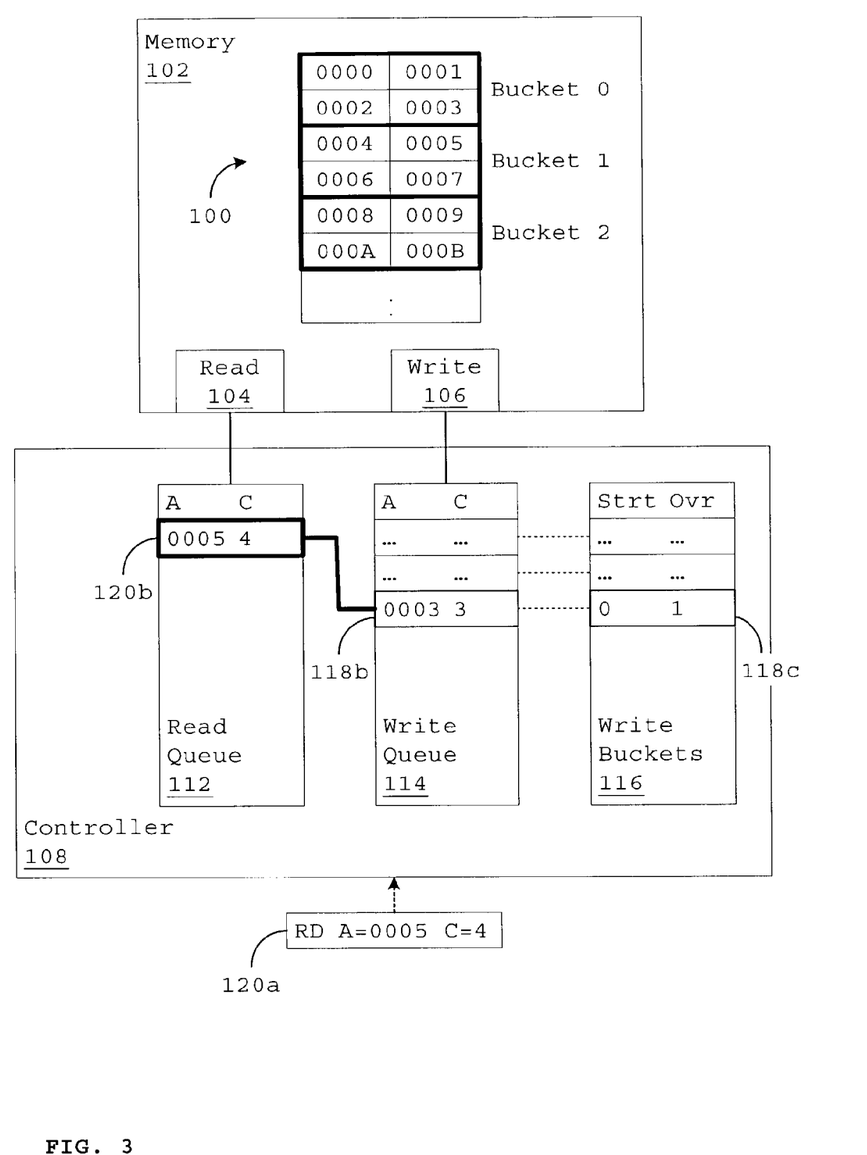

As shown in FIG. 2, the controller 108 stores information 116 identifying buckets having addresses that will be accessed for different commands in the write queue 114. After receipt of a read command, the controller 108 can use the stored information 116 to quickly identify a write command requesting access to a memory address in a bucket that also includes a memory address to be accessed for the read command. To illustrate operation of such a scheme, FIGS. 2 and 3 depict controller 108 processing of a write command (118a, FIG. 2) followed by a read command (120a, FIG. 3).

As shown, in FIG. 2, the controller 108 receives the write command 118a. The controller 108 both adds the write command 118a to the write queue 114 and determines the bucket(s) 122 affected by the write 118a. For example, the write command 118a will access memory addresses (shaded) in bucket "0" 122a and bucket "1" 122b.

As shown, the controller 108 can store 116 identification of the determined buckets for the write command 118a. For example, the stored 116 bucket information can include the start bucket (labeled "Strt") and may also include identification of one or more overflow buckets (labeled "Ovr"). The size of a bucket (e.g., the number of addresses mapped to a bucket) may be such that a given command will straddle two buckets at most (e.g., bucket size=maximum count value). Finally, the information 116 may also include a reference (shown as a dotted line) to the corresponding write queue 114 entry 118b. As shown, the bucket data 116 parallels the write queue 114. That is, a write queue 114 entry 118b has corresponding bucket 116 data 118c. As different entries are added and removed from the write queue 114, the corresponding bucket data 116 may be added and removed.

To speed access to the bucket data 116, the data 116 may be stored in a content-addressable memory (CAM). Unlike memory that retrieves stored data using an addressing scheme, a CAM can retrieve stored data based on key values. For example, in response to a request for entries having a "Strt" value of "1", the CAM can retrieve data that identifies write queue 114 entry 118b.

As shown in FIG. 3, the controller 108 next receives the read command 120a. The controller 108 both queues the read command 120b in the read queue 112 and determines the bucket(s) that include the memory address(es) to be accessed for the read command 120b (e.g., buckets 1 and 2). The controller 108 then searches the write bucket data 116 to identify queued 114 write commands associated with a same bucket as the read command 120a. In this example, write command 118b and read command 120b both access memory location(s) in bucket "1". Because bucket(s) associated with the read command 118a may be the same as either the start bucket or overflow bucket of a write command, the search may feature up to four different components: (1) a search for write commands having the same start bucket as the read command; (2) a search for write commands having an overflow bucket that is the same as the read command's start bucket; and, if the read command occupies multiple buckets, (3) a search for write commands having start buckets that are the same the read command's overflow bucket; and (4) a search for write commands having the same overflow bucket as the read command.

As shown in FIG. 3, if the controller 108 identifies a write command 118b associated with a bucket also associated with the read command 118a, the controller 108 can link the read command 120b to the write command 118b (shown as a line connecting 120b and 118b). This link may be stored, for example, as information in the read queue 112 or a queue paralleling the read queue (not shown). Once linked, the controller 108 can retain the read command 120b in the read queue 112 until an instruction for the linked write command 118b is output to memory 102. While the controller 108 retains read command 120b, the controller 108 can continue to issue instructions to the memory 102 for other read commands in the read queue 112.

Potentially, more than one queued write command may be associated with buckets also associated with the read command. In such a case, the controller 108 may be configured to link the read command 118b to a matching write command most recently queued.

Figure 4:
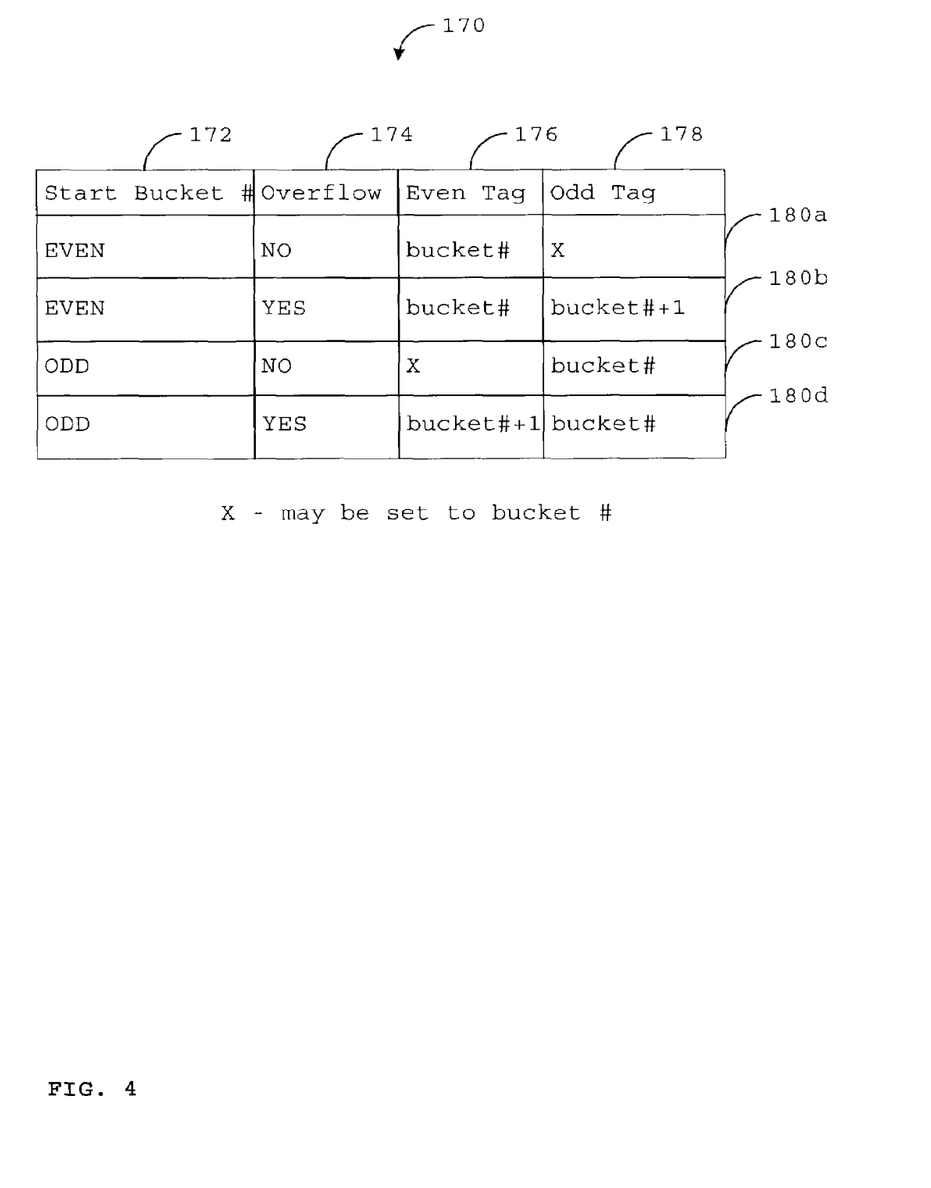
FIG. 4 is a table specifying a scheme for storing bucket identifiers for memory access commands.
Figure 5:
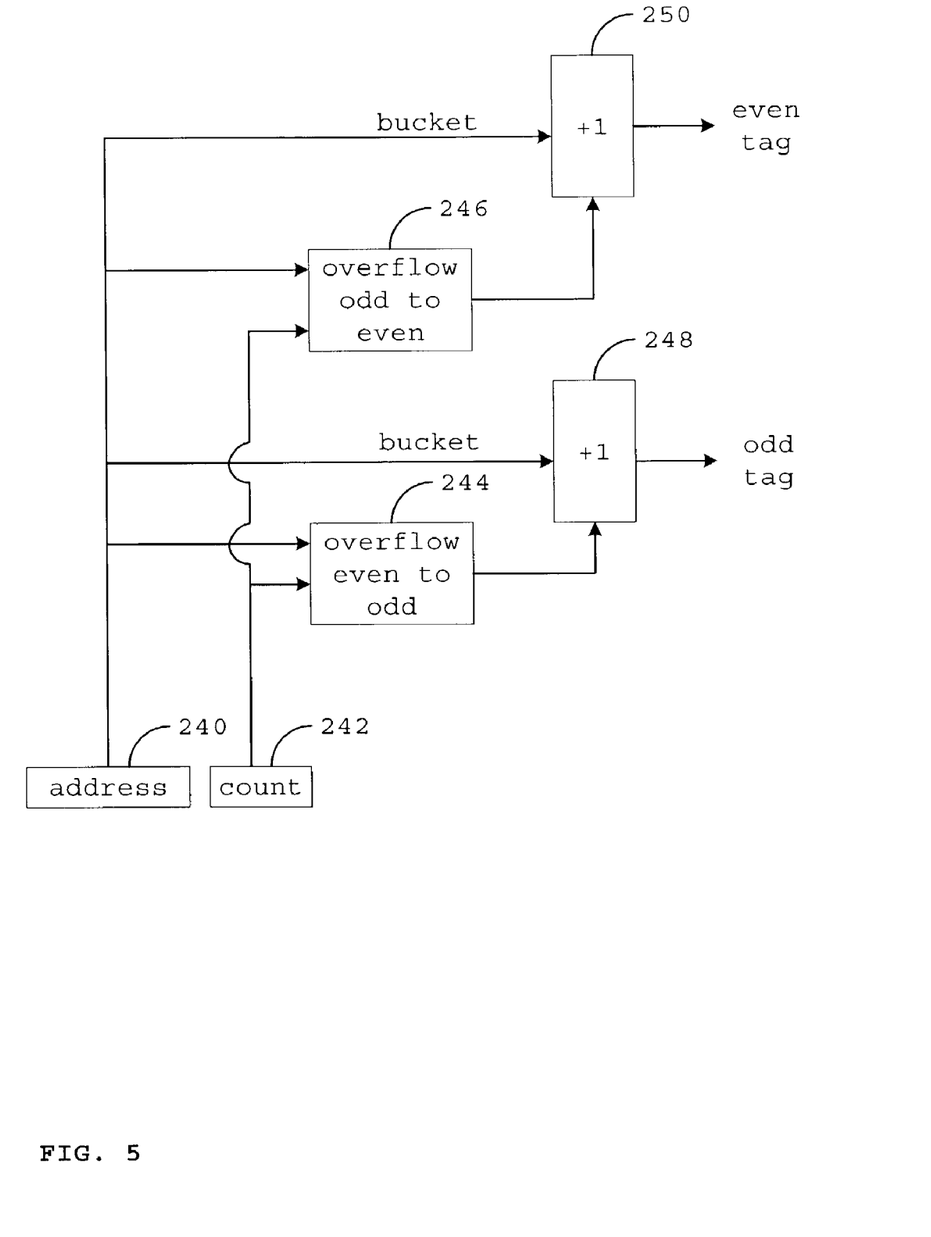
FIG. 5 is a diagram of logic used to determine bucket identifiers for memory access commands.
Figure 6:
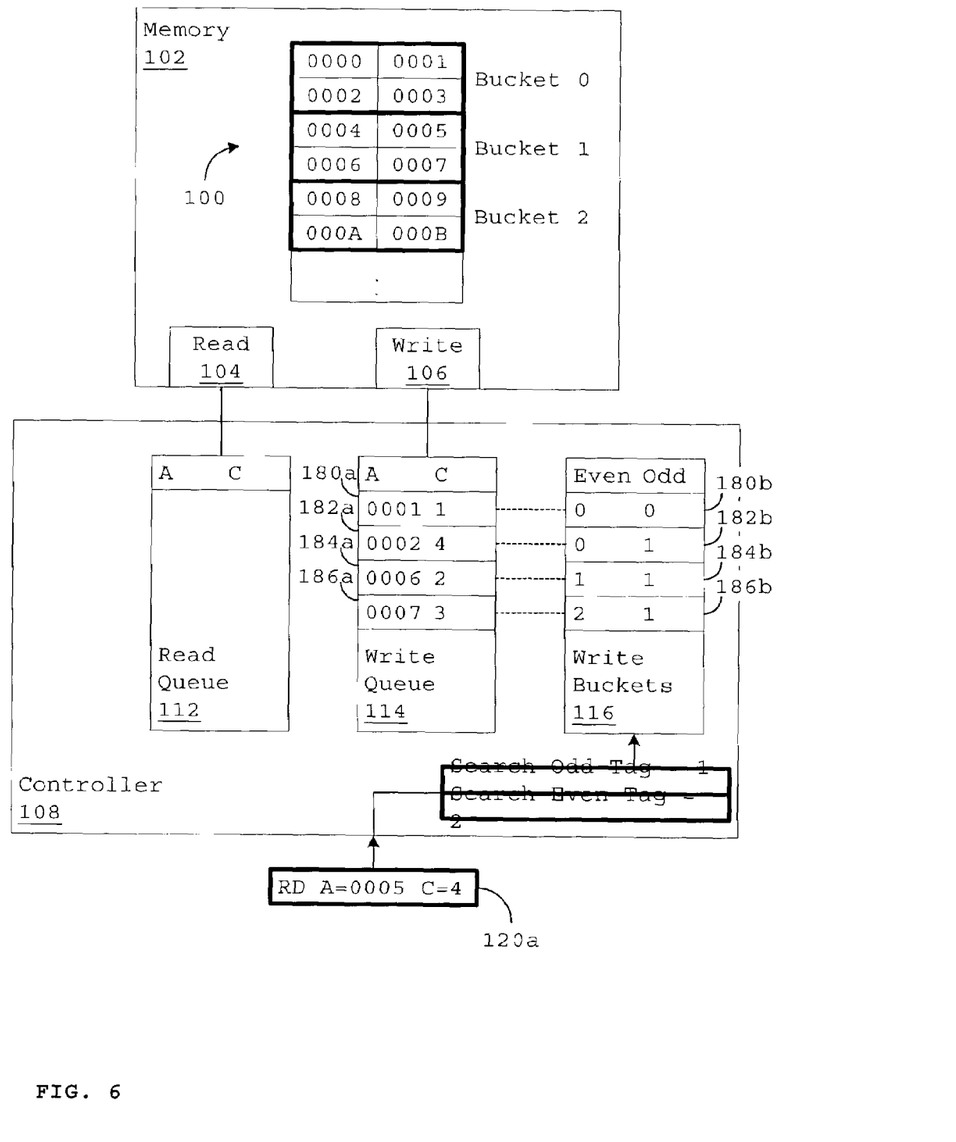
FIG. 6 is a diagram illustrating memory access control.

The scheme shown in FIGS. 2 and 3 used up to four searches to provide a guarantee of read/write consistency. FIGS. 4–6, however, illustrate a scheme that can reduce this number. The scheme establishes two tags for a command—an even tag and an odd tag. The values of these tags vary based on whether the starting bucket of a command is an even or odd value. Storing the tag values organizes the bucket information such that values of odd buckets of interest are stored as odd tag values while even buckets of interest are stored as even tag values. Thus, the search for read command buckets also associated with queued 114 write commands becomes a search, at most, for: (1) write commands having the same even tag as the read command; and (2) write commands having the same odd tag as the read command. Thus, in a worst-case scenario, the controller 108 need only perform two searches.

In greater detail, FIG. 4 depicts a table 170 identifying even 176 and odd 178 tag values for read and write commands based on the starting bucket 172 of the command and whether a command overflows into multiple buckets 174. For example, for commands starting 172 at an even bucket and overflowing 174 to an odd bucket (row 180b of table 170), the even tag value 176 is the value of the starting bucket and the odd tag value 178 is the value of the overflow bucket.

As shown, some tag values (labeled "X") are not significant in the scheme but are set to values that will not interfere with operation. For example, for a command starting with an even bucket and not overflowing into an odd bucket (row 180a of table 170), the value of the odd bucket does not matter as long as the value is set so that it will not match a search for odd tag value. Thus, in this example, the value may be set to some null value or the same value as the even tag (and vice-versa in the case of a command starting with an odd bucket and not overflowing into an even bucket (row 180c of table 170)).

Thus, after receiving a write command, the controller can determine the even 176 and odd 178 tag values in accordance with table 170. The controller can then store these values in one or more CAMs as an entry for the write command. For example, a first CAM may store even tag values while a second CAM stores the odd tag values. When the controller 108 receives a read command, the controller can determine the even and odd tag values for the read command and search the CAM(s) for entries having the same even tag value and/or entries having the same odd tag value as the read command. Thus, a search for queued write commands associated with bucket(s) also associated with the read command can be reduced to two or fewer searches.

A wide variety of digital logic (e.g., hardware, firmware, and/or software) may be used to generate tag values for a command. For example, FIG. 5 depicts sample digital logic for determining the even and odd tag values according to the table shown in FIG. 4. The same logic may be used both to determine the tag values to store for write commands and the tag values to search for read commands.

As shown, the logic operates on the address 240 and data count 242 included in a command. The logic includes two incrementors 250, 248 that output the even and odd tag values by conditionally adding one to a bucket number derived from the address 240. For example, incrementor 250 receives the bucket number for the address 240 and the output of logic 246 that determines if the command overflows from an odd bucket into an even bucket. If so, the incrementor 250 outputs the received bucket number incremented by one; otherwise, the incrementor 250 outputs the received bucket number unchanged. Similarly, if the command overflows from an even bucket to an odd bucket, incrementor 248 outputs the received bucket number incremented by one, but otherwise outputs the received bucket number.

FIG. 6 illustrates sample operation of a tagging scheme. As shown, a controller 108 has queued 114 four different write commands 180a–186a and stored 116 the corresponding even and odd tag values 180b–186b for the commands. Again, as an example, a write command 182a starting at address "0002" and having a count of "4" would start in bucket "0", an even bucket number, and overflow to bucket "1". Thus, in accordance with table 170, the even tag value for the write command would be "0" and the odd-tag value would be "1" (entry 182b). Similarly, a write command 186a starting at address "0007" and having a count of "3" would start in bucket "1", an odd bucket, and overflow into bucket "2". Again, in accordance with table 170, the odd tag value for the command would be "1" and the even tag value would be "2" (entry 186b).

As shown, the controller 108 receives a read command 120a having a start address of "0005" and a count of "4". Thus, the read command 120a starts at bucket "1", an odd bucket, and overflows into bucket "2". Therefore, in accordance with table 170, the read command 120a has an odd tag value of "1" and an even tag value of "2". Searching the write bucket 116 data for entries having an odd tag of "1" identifies three 182b, 184b, 186b different queued write commands. Since the read command 120a overflows into multiple buckets, the controller 108 can also search the write bucket 116 data for entries having an even tag value of "2". This second search identifies a single 186b write command. Again, the controller 108 may queue the read command 120a and link the command 120a to the matching queued write entry 186a most recently added to the queue 114 before the arrival of the read command 120a.

Figure 7:
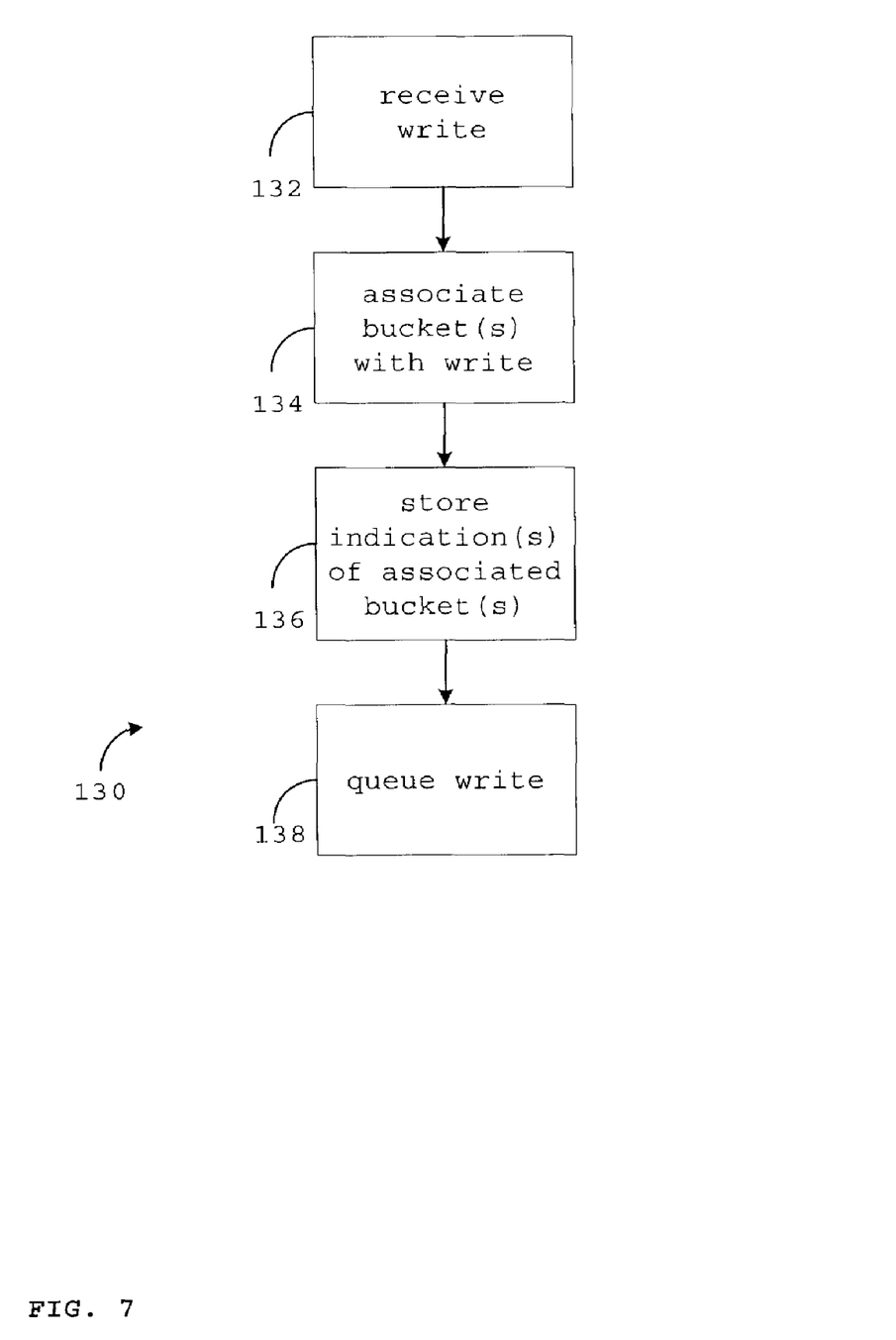
FIGS. 7–9 are flowcharts of processes for handling memory access commands.
Figure 8:
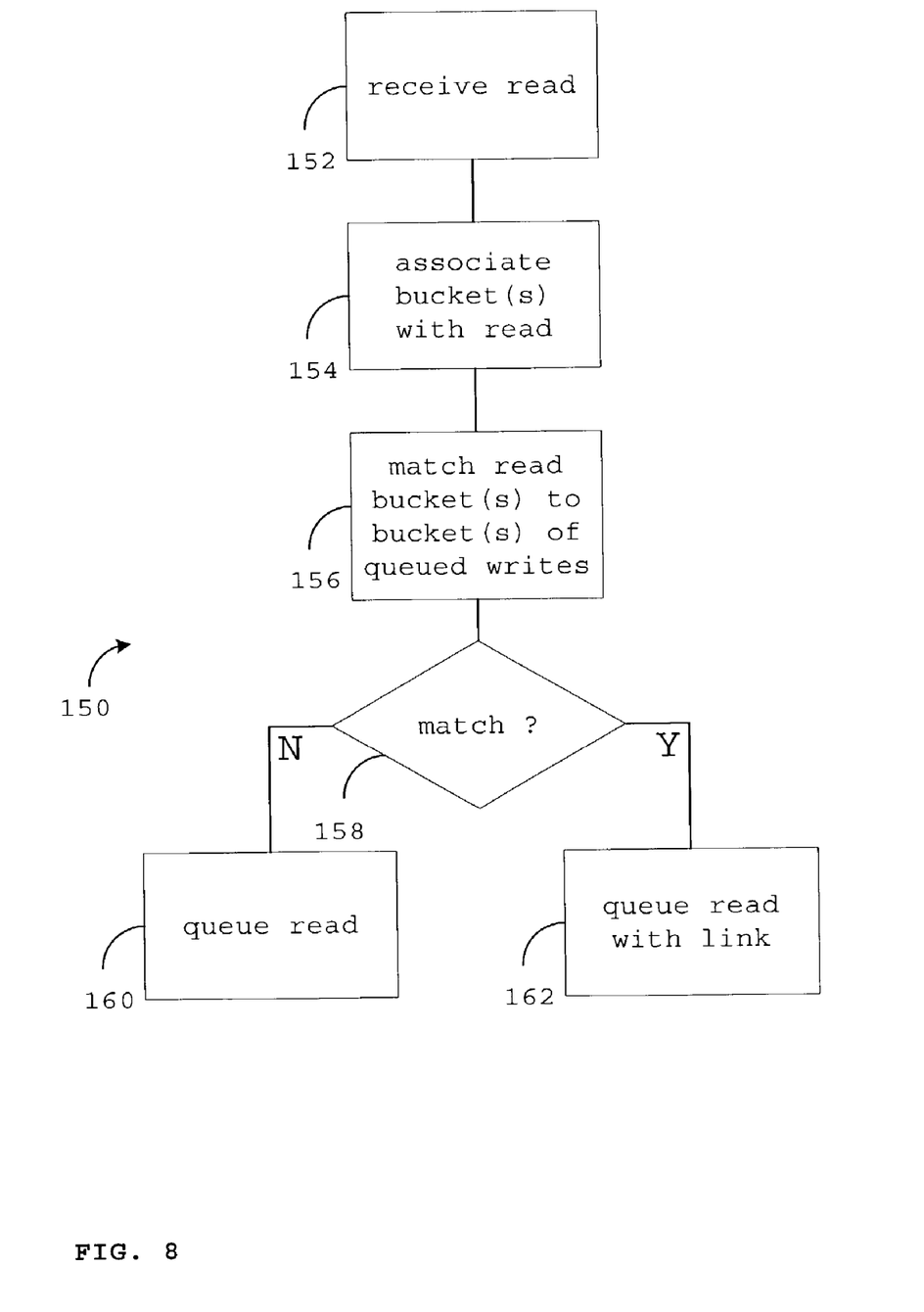
Figure 9:
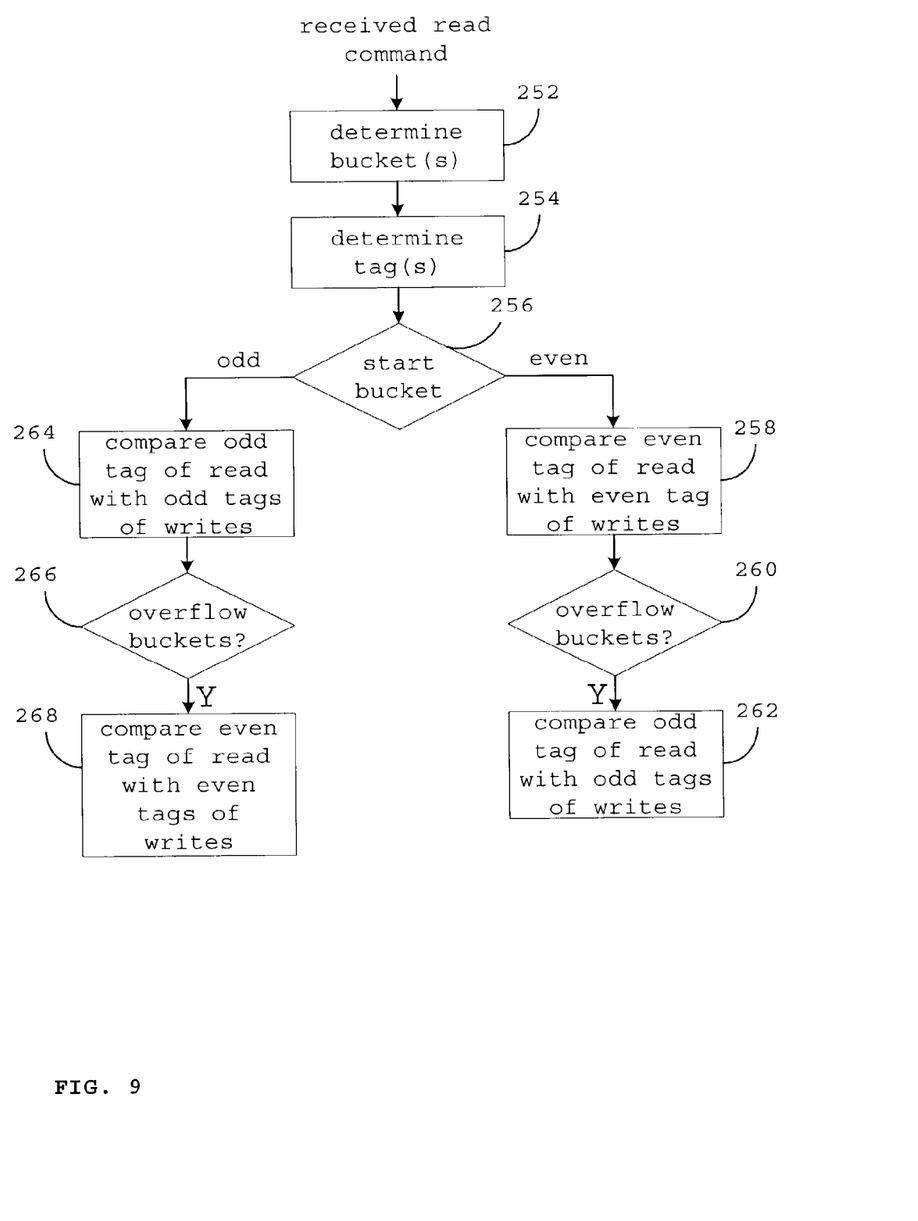

FIGS. 7–9 are flow-charts of processes for controlling memory access using techniques described above. As shown in FIG. 7, for received 132 write commands, a process 130 determines 134 the bucket(s) associated with the write and stores 136 indications of these buckets, for example, in a CAM. The process 130 also queues 138 the write command.

As shown in FIG. 8, for received 152 read commands, a process 150 determines 154 the bucket(s) associated with the read and determines 156 whether the bucket(s) correspond to a bucket associated with a queued write command. If so 158, the process 150 can queue 162 the read command with a link to a write command that should be issued to memory before the read command. Otherwise, the process 150 can queue 160 the read command without a link.

In the case of an "even/odd bucket" scheme, the process of determining whether the bucket(s) associated with a read command correspond to buckets of queued write commands may proceed as shown in FIG. 9. As shown, after determining 252 one or more buckets associated with a read command and determining 254 the even/odd tag values for the command, processing may continue based on whether the starting bucket 256 is odd or even. If the start bucket is even, the process attempts to match 258 the even bucket of the command with even buckets associated with queued write commands. If the read command overflows 260 into multiple buckets, the process may perform an additional search that attempts to match 262 the odd bucket of the read command with an odd bucket of queued write commands. A similar sequence 264–268 may proceed for commands having an "odd" start bucket. The above sequences can reduce the amount of searching performed for commands that only request access to memory address(es) found within a single bucket.

Figure 10:
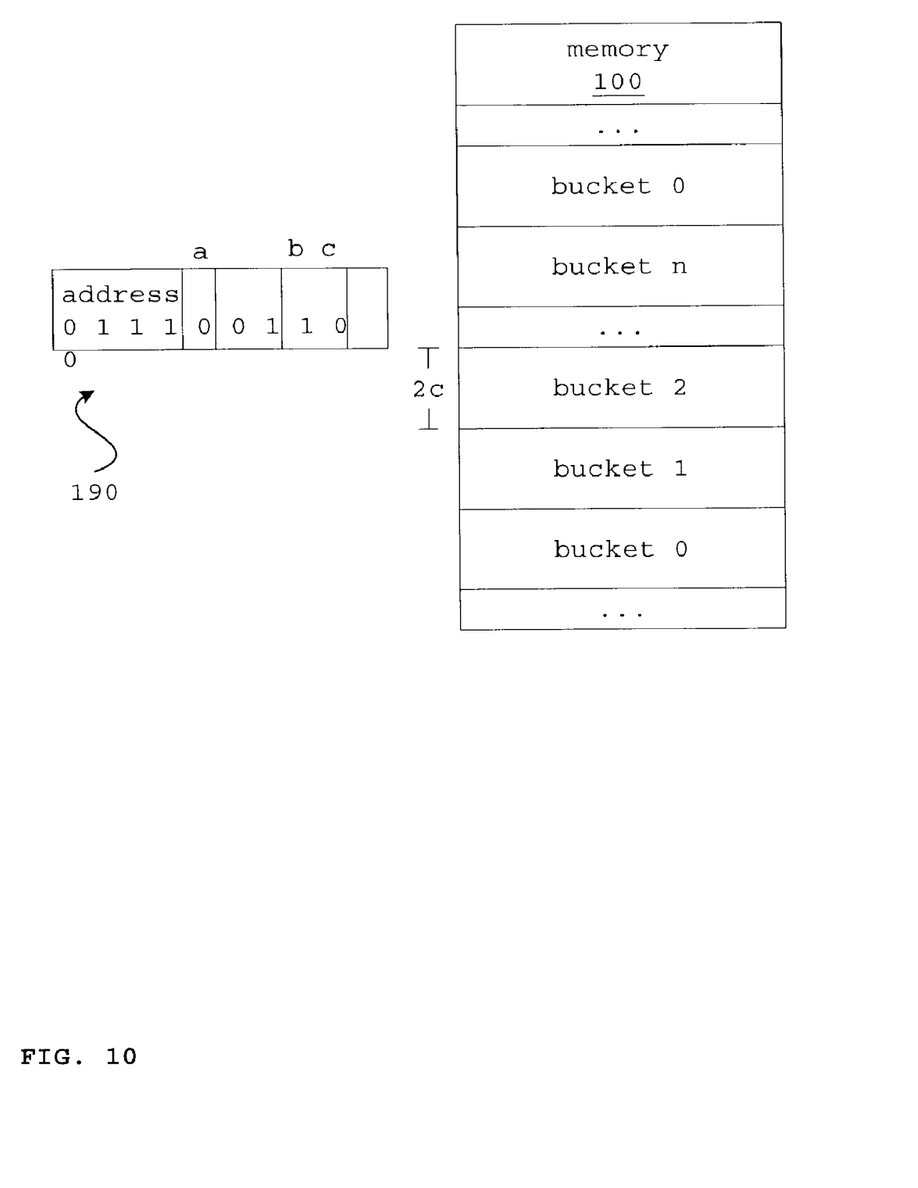
FIG. 10 is a diagram illustrating a bucket mapping scheme.

FIG. 10 illustrates a memory address-to-bucket mapping scheme in greater detail. As shown in FIG. 10, portions of a memory address 190 may be used to identify a bucket. The portion(s) of address 190 used to identify a bucket need not be contiguous. For example, as shown bits a, b, and c of address 190 may identify a particular bucket. In this case, bits a, b, and c collectively identify bucket "2" ($2_{base10} = 0_{bit-a} 1_{bit-b} 0_{bit-c\ base\ 2}$). The address size of a particular bucket segment in such a scheme would be $2^c$ where c is the position of the least significant bit used to identify a bucket. While FIGS. 1–3 and 6 illustrated buckets as contiguous blocks of addresses, as shown in FIG. 10, different portions of the same bucket may be distributed across the memory.

Memory access control techniques described above may be used in a wide variety of systems including systems that process packets (e.g., Internet Protocol (IP) packets, Asynchronous Transfer Mode (ATM) cells, frames, and other protocol data units). For example, such systems may operate as routers, switches, firewalls, line cards, storage area network (SAN) components, and so forth. Such systems can process packets, for example, by performing packet classification, performing address lookups, determining an egress port for a packet, and so forth.

Figure 11:
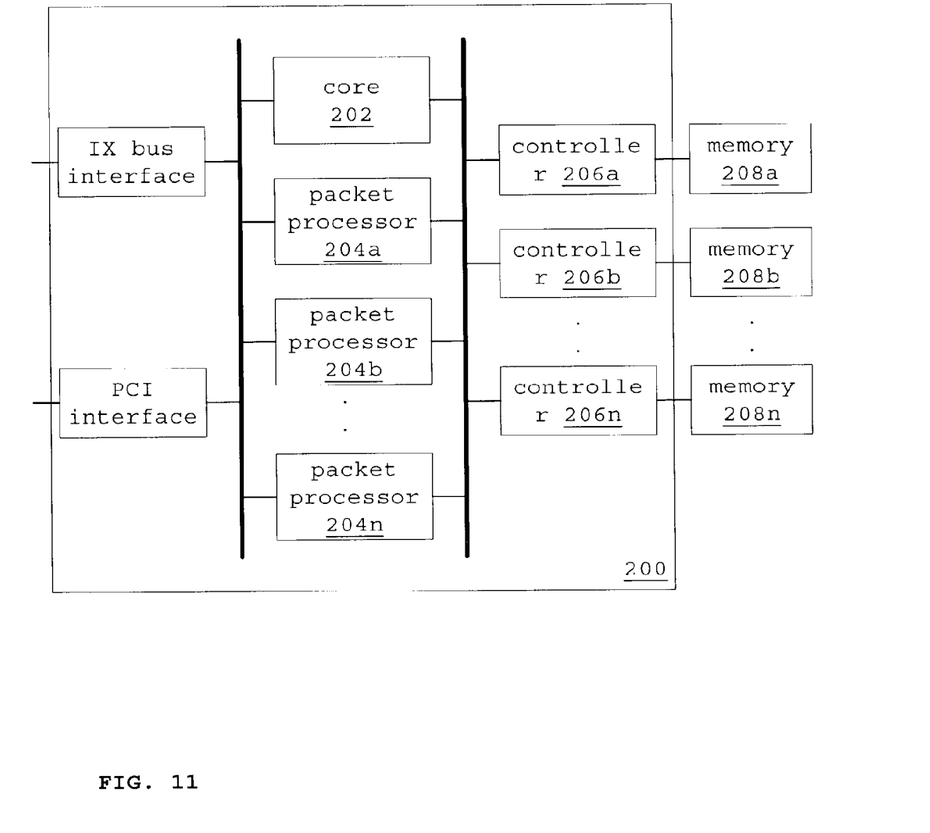
FIG. 11 is a diagram of a network processor.

The packet processing systems may feature a design that features a software programmed general purpose Central Processing Unit (CPU) processor. Other systems may have designs featuring dedicated "hard-wired" approaches such as designs using components known as application-specific integrated circuits (ASICs). Yet other systems may use a programmable device known as a network processor. As an example, FIG. 11 depicts a schematic of an Intel® IXP® (Internet eXchange network Processor) network processor 200 configured to use memory access control techniques described above.

As shown, the network processor 200 includes multiple packet processors 204 within a single chip. A packet processor 204 is generally a software programmable Reduced Instruction Set Computer (RISC) processor featuring an architecture optimized for common packet processing tasks (e.g., bit manipulation). These processors 204 typically lack instructions seldom used in packet processing such as floating-point operations, integer multiplication and division, and so forth. A packet processor 204 may be designed for multithreaded operation, for example, by having hardware registers designated for different threads. The packet processor 204 may quickly switch between different threads. This can permit a processor 204 to process multiple packets efficiently, for example, by using different threads to process different packets.

In addition to the packet processors 204, the network processor 200 can also include a "core" processor 202. The core processor 202 may assist the packet processors 202 and handle "control plane" tasks such as updating routing tables or other "housekeeping" tasks associated with different network protocols. The network processor 200 may also include other components such as a bus interface (e.g., an Internet Exchange (IX) bus interface) for communicating (e.g., sending and receiving packets) with other network components, a bus interface for communicating with an external control processor (e.g., a Peripheral Control Interconnect (PCI) bus interface), a hash engine, scratchpad memory, and so forth.

As shown, the network processor 200 also includes a collection of memory controllers 206 that can control external memory 208 such as SRAM (Static Random Access Memory) (e.g., double data rate and/or quad-data rate SRAM) and DRAM (Dynamic Random Access Memory) chips. Arbiters (not shown) handle the task of coordinating the exchange of information (e.g., commands and the results) between the processors 204, 202 and different controllers 206. Thus, a given controller 206 may receive read and write commands from different processors 204, 202 and process these commands using techniques described above.

Figure 12:
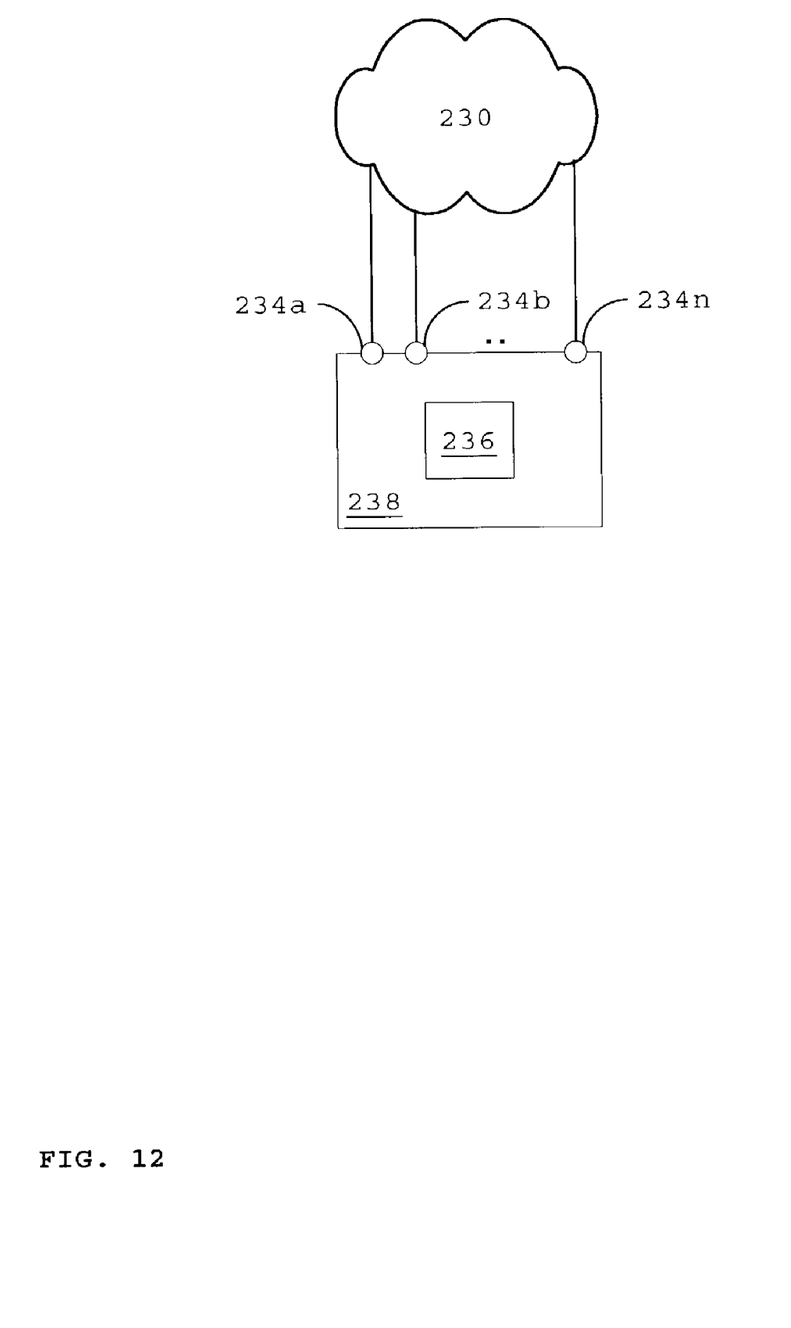
FIG. 12 is a diagram of a network device.

FIG. 12 illustrates a network device 238 that can implement the memory access control techniques described above. As shown, the device 238 features a collection of ingress and egress communication ports 234a–234n for communicating with other network 230 devices via transmission mediums (e.g., copper, optic cables, and/or wireless transmission). The device 238 may also feature one or more data link layer devices (e.g., Ethernet medium access control MAC devices, SONET framers, and so forth) and PHY (physical) layer devices for handling communication over the transmission mediums. As shown the device 238 also includes a processing block 236 that can process a packet received via the PHY and link layer devices. In addition to other packet processing elements (e.g., one or more processors), the processing block 236 may include memory and one or more controllers configured to control memory access requests as described above. For example, the processing block 236 may include the network processor 200 shown in FIG. 11 that features controllers 206 configured to use the memory access control techniques described above.

The techniques described may be used in a wide variety of hardware or software configurations other than those described above and may have applicability in a wide variety of computing or processing environments. The techniques may be implemented in hardware, software, firmware, or a combination of the two. For example, aspects of the techniques may be implemented in a computer program executed by a processor. Such program(s) may be implemented in a high level procedural or object oriented programming language. However, the program(s) can be implemented in assembly or machine language if desired. The language may be compiled or interpreted.

Other embodiments are within the scope of the following claims.

What is claimed is:

1. A method of controlling access to a memory, the method comprising:
   storing identification of one or more memory buckets associated with different, respective, queued write commands, different buckets corresponding to different sets of memory addresses of the memory, wherein the storing identification of one or more memory buckets comprises storing identification of, at least, a starting bucket and identification of a non-overlapping ending bucket for write commands that span multiple buckets; and
   based on the stored identification, determining whether at least one bucket associated with a read command is included in one or more buckets associated with at least one queued write command.

2. The method of claim 1, further comprising, if it is determined that at least one bucket associated with the read command is included in the one or more buckets associated with at least one queued write command, retaining the read command until an instruction for the at least one queued write command associated with the bucket(s) is output to the memory.

3. The method of claim 1, further comprising:
   queuing read commands in at least one read queue; and
   queuing write commands in at least one write queue.

4. The method of claim 3, further comprising:
   outputting read commands in the at least one read queue to at least one read port of the memory; and
   outputting write commands in the at least one write queue to at least one write port of the memory.

5. The method of claim 3, wherein the memory comprises a quad data rate memory.

6. The method of claim 1,
   wherein storing identification of the one or more memory buckets comprises storing identification in at least one content-addressable memory; and
   wherein the determining whether at least one bucket associated with a read command is included in the one or more buckets associated with at least one queued write command comprises searching the at least one content-addressable memory using identification of the at least one bucket associated with the read command.

7. The method of claim 1, wherein a write command comprises a specification of a starting address and an address count.

8. The method of claim 1, further comprising associating one or more buckets with a received write command.

9. The method of claim 1, wherein the identification comprises a number.

10. The method of claim 9, further comprising determining even and odd tag values for a command based on whether a number of a bucket associated with a command is even or odd.

11. The method of claim 10, wherein the determining whether at least one bucket associated with a read command is included in one or more buckets associated with at least one queued write command comprises identifying one or more queued write commands having a same even tag value as the read command and one or more queued write commands having a same odd tag value as the read command.

12. The method of claim 1, further comprising receiving read and write commands issued by more than one processor.

13. A memory controller, comprising:
a controller memory device; and
digital logic to:
store in the controller memory device identification of one or more memory buckets associated with different, respective, queued write commands in the content-addressable memory, different buckets corresponding to different sets of memory addresses, wherein the logic to store identification of one or more memory buckets comprises logic to store identification of a starting bucket and identification of a non-overlapping ending bucket for write commands that span multiple buckets; and
based on the stored identification, determine whether at least one bucket associated with a read command is included in one or more buckets associated with at least one queued write command.

14. The controller of claim 13, further comprising digital logic to, if it is determined that at least one bucket associated with the read command is included in the one or more buckets associated with at least one queued write command, retain the read command until an instruction for the at least one queued write command associated with the buckets is output to the memory.

15. The controller of claim 13, further comprising digital logic to provide
at least one read queue to queue read commands; and
at least one write queue for to queue write commands.

16. The controller of claim 15, wherein the controller comprises digital logic to output read instructions corresponding to read commands in the at least one read queue to a first port of a dual-port memory device and output write instructions corresponding to write commands in the at least one write queue to a second port of the dual-port memory device.

17. The controller of claim 13, wherein the controller memory device comprises at least one content-addressable memory.

18. The controller of claim 13, wherein the digital logic comprises digital logic to:
determine an even and odd tag value for a command based on numeric identifiers of the one or more buckets associated with the command.

19. The controller of claim 18, wherein the digital logic to determine whether the at least one bucket associated with a read command is included in one or more buckets associated with at least one queued write command comprises:
determining an even and odd tag value for the read command; and
comparing the determined even and odd values of the read command against the determined even and odd values of the write commands stored in the controller memory device.

20. A network processor, comprising:
a bus interface to receive network packet data;
at least one processor to process at least a portion of the received network packet data; and
at least one memory controller, the memory controller comprising digital logic to:
store identification of one or more memory buckets associated with different, respective, queued write commands, different buckets corresponding to different sets of memory addresses, wherein the logic to store identification of one or more memory buckets comprises logic to store identification of a starting bucket and identification of a non-overlapping ending bucket for write commands that span multiple buckets and
based on the stored identification, determine whether at least one bucket associated with a read command is included in the one or more buckets associated with at least one queued write command.

21. The network processor of claim 20, further comprising digital logic to, if it is determined that at least one bucket associated with the read command is included in the one or more buckets associated with at least one queued write command, retain the read command until an instruction for the at least one queued write command associated with the buckets is output to the memory.

22. The network processor of claim 20, further comprising digital logic to provide
at least one read queue to queue read commands; and
at least one write queue for to queue write commands.

23. The network processor of claim 22, wherein the memory comprises a quad data dual port memory.

24. The network processor of claim 22, wherein the controller comprises digital logic to output read instructions corresponding to read commands in the at least one read queue to a first port of a dual-port memory device and output write instructions corresponding to write commands in the at least one write queue to a second port of the dual-port memory device.

25. The network processor of claim 20, wherein the controller memory device comprises at least one content-addressable memory.

26. The network processor of claim 20, wherein the digital logic comprises digital logic to:
determine an even and odd tag value for a command based on numeric identifiers of the one or more buckets associated with the command.

27. The network processor of claim 20, wherein the digital logic to determine whether the at least one bucket associated with a read command is included in one or more buckets associated with at least one queued write command comprises:
determining an even and odd tag value for the read command; and
comparing the determined even and odd values of the read command against the determined even and odd values of the write commands stored in the controller memory device.

28. The network processor of claim 20, wherein the at least one processor comprises at least one processor to perform at least one of the following packet processing operations: packet classification, address lookup, and determining an egress port for a packet.

29. A network device, comprising:
at least one Ethernet medium access control (MAC) device;

at least one processor to process packet data received via the at least one MAC device;

at least one dual-port quad-data rate memory; and at least one memory controller to receive commands to access the dual-port quad-data rate memory issued by the at least one processor, the memory controller comprising digital logic to:

store identification of one or more memory buckets associated with different, respective, queued write commands, different buckets corresponding to different sets of memory addresses, wherein the logic to store identification of one or more memory buckets comprises logic to store identification of a starting bucket and identification of a non-overlapping ending bucket for write commands that span multiple buckets; and based on the stored identification, determine whether at least one bucket associated with a read command is included in at least one bucket associated with at least one queued write command.

30. The device of claim 29, further comprising digital logic to, if it is determined that at least one bucket associated with the read command is included in the one or more buckets associated with at least one queued write command, retain the read command until an instruction for the at least one queued write command associated with the buckets is output to the memory.

31. The device of claim 29, further comprising digital logic to provide at least one read queue to queue read commands; and at least one write queue for to queue write commands.

32. The device of claim 31, wherein the controller comprises digital logic to output read instructions corresponding to read commands in the at least one read queue to a first port of a dual-port memory device and output write instructions corresponding to write commands in the at least one write queue to a second port of the dual-port memory device.

33. The device of claim 29, wherein the controller comprises at least one content-addressable memory to store the identification.

34. The device of claim 29, wherein the digital logic comprises digital logic to:

determine an even and odd tag value for a command based on numeric identifiers of the one or more buckets associated with the command.

35. The device of claim 29, wherein the digital logic to determine whether the at least one bucket associated with a read command is included in one or more buckets associated with at least one queued write command comprises:

determining an even and odd tag value for the read command; and comparing the determined even and odd values of the read command against the determined even and odd values of the write commands stored in the controller memory device.

36. A processor, comprising:

multiple programmable processing elements within a single chip; and at least one memory controller to receive commands from the multiple programmable processing elements, the memory controller comprising digital logic to:

store identification of one or more memory buckets associated with different, respective, queued write commands, different buckets corresponding to different sets of memory addresses; and based on the stored identification, determine whether at least one bucket associated with a read command is included in at least one bucket associated with at least one queued write command, wherein the digital logic to determine whether the at least one bucket associated with a read command is included in one or more buckets associated with at least one queued write command comprises:

determining an even and odd tag value for the read command; and comparing the determined even and odd values of the read command against the determined even and odd values of the write commands stored in the controller memory device.

37. The processor of claim 36, further comprising digital logic to:

provide at least one read queue to queue read commands and at least one write queue to queue write commands; and wherein the digital logic comprises logic that if it is determined that at least one bucket associated with the read command is included in the one or more buckets associated with at least one queued write command, retain the read command until an instruction for the at least one queued write command associated with the buckets is output to the memory.

38. The processor of claim 37, wherein the controller comprises digital logic to output read instructions corresponding to read commands in the at least one read queue to a first port of a dual-port memory device and output write instructions corresponding to write commands in the at least one write queue to a second port of the dual-port memory device.

39. The method of claim 1, wherein the beginning bucket and ending bucket comprise ones of a set of multiple same size buckets contiguously occupying an address space.

40. The controller of claim 13, wherein the beginning bucket and ending bucket comprise ones of a set of multiple same size buckets contiguously occupying an address space.

* * * * *